Feb. 22, 1966 C. H. SNYDER 3,236,527

FERTILIZER SPREADER

Filed Sept. 13, 1962 11 Sheets-Sheet 1

INVENTOR.

CLIFFORD H. SNYDER

BY William D. Carothers

HIS ATTORNEY

Feb. 22, 1966 C. H. SNYDER 3,236,527

FERTILIZER SPREADER

Filed Sept. 13, 1962 11 Sheets-Sheet 2

INVENTOR.
CLIFFORD H. SNYDER
BY William D. Carothers
HIS ATTORNEY

INVENTOR.
CLIFFORD H. SNYDER
BY William D. Carothers
HIS ATTORNEY

INVENTOR.
CLIFFORD H. SNYDER
BY William D. Carothers
HIS ATTORNEY

Feb. 22, 1966 C. H. SNYDER 3,236,527

FERTILIZER SPREADER

Filed Sept. 13, 1962 11 Sheets-Sheet 5

INVENTOR.
CLIFFORD H. SNYDER
BY William D. Carothers
HIS ATTORNEY

INVENTOR.
CLIFFORD H. SNYDER
BY William D. Crowther
HIS ATTORNEY

INVENTOR.
CLIFFORD H. SNYDER
BY William D. Carothers
HIS ATTORNEY

INVENTOR.
CLIFFORD H. SNYDER
BY William D. Carothers
HIS ATTORNEY

INVENTOR.
CLIFFORD H. SNYDER
BY William D. Carothers
HIS ATTORNEY

Feb. 22, 1966 C. H. SNYDER 3,236,527

FERTILIZER SPREADER

Filed Sept. 13, 1962 11 Sheets-Sheet 10

INVENTOR.
CLIFFORD H. SNYDER
BY William D. Carothers
HIS ATTORNEY

INVENTOR.
CLIFFORD H. SNYDER
BY William D. Carothers
HIS ATTORNEY

United States Patent Office 3,236,527

Patented Feb. 22, 1966

3,236,527
FERTILIZER SPREADER

Clifford H. Snyder, Sunnyhill Farms, R.D. 1, Imperial, Pa.

Filed Sept. 13, 1962, Ser. No. 223,407
2 Claims. (Cl. 275—3)

This invention relates to spreaders for broadcasting fertilizers, sand, salt, seed, pesticides, fungicides, herbicides, and the like.

In general there are three types of spreaders, the drill type, the spinner type, and the auger drill type.

In the drill spreader type the material drops through small orifices usually placed three to eight inches apart. These orifices clog with small chunks formed from moisture in the material. The machine dribbles material in rows leaving streaks in the field, and a stripped area between the streaks. The machine spreads material only within the area under the actual spreader. It does not broadcast beyond dimensions of the spreader. To cover widths of twelve to fourteen feet the drill type spreader is too wide to travel on highways or through ordinary gates. Such drill type units generally require an agitator rotating over the orifices. The orifices and agitator are conducive to excessive corrosion requiring the unit to be turned upside down and often even dismantled in order to clean after usage. The drill type spreader cannot handle material such as grass, straw and hard lumpy particles.

In the spinner type spreader the material tends to spill rather than spread. Spinner by design discharges in a complete circle. Since spinner cannot discharge against its support this part of the discharge area builds up and causes concentrated spillage at some point in broadcast area. A spinner cannot broadcast coarse material satifactorily. Material must be conveyed to spinner. A concentrated overlap of material occurs when dual spinners are used. The inherent design of spinner spreaders prevent large tonnage broadcast with any semblance of uniformity. Moist material in lumps is spilled in gobs.

In the auger drill type spreaders a tube and auger is used to feed the material through orifices in the bottom of the tube. They often employ folding tubes and augers to gain greater spreading width. This type spreader has the same problems as the drill type with the additional difficulties created by the folding extensions when going over rough ground, ditches, and hillsides.

None of these spreaders can satisfactorily spread materials containing grain, straw, and other impurities. For these reasons most conventional spreaders cannot utilize bulk fertilizers which may be bought at a lower price and dumped on fields or in storage where globs and clods are frequently picked up. Thus the user misses out on the opportunity of saving bagging costs and advantages of off-season bulk fertilizer purchases, which savings are generally $4 to $8 per ton.

Again the prior art spreader has no way to blend different fertilizers or materials at the same time and apply them simultaneously. This is particularly true if these materials are of different sizes and grades.

There is considerable power required to operate the paddle or screw over the orifices in the drill type spreaders.

The spreader comprising this invention eliminates all of these difficulties and provides many advantages which are impossible to obtain with the present spreader art. This spreader does not have to travel over the area on which the material is spread.

An important object of this invention is the provision of a free and fully exposed rotary paddle-like member onto which the material to be distributed is dropped freely through the air and onto the rotary paddle where it is catapulted in a trajectory extending from the direction of rotation. These radially extending rotating members or paddles strike the material as it intercepts their path and thus break it up if it is lumpy and broadcast it laterally from the axis of rotation. The paddles may be solid and continuous or independent or pivoted free swinging members which provide a hammer or batting function to break up and distribute the material. A fast paddle speed develops a strong air current that follows to some degree the general trajectory of bodies thrown therefrom by centrifugal force. Any material dropped over a rotating paddle that is picked up by this air current is broadcast laterally without even engaging the paddle. Thus the air current caused by the rotating paddle member functions to spread particles as well as the direct impact of the paddles themselves. The degree of coverage caused by each of these two forces through lateral broadcasting depends entirely upon the particles being distributed. The heavier particles broadcast further when struck by the paddle than when carried only by air current and vice versa with the lighter particles. This inverse coverage produces a uniform distribution over the area which cannot be obtained by any other spreader. All the material is engaged by these radially extending rotary members and none can drop therethrough.

This spreader is capable of spreading all different kinds of fertilizer and many other materials including lime as well as seeds, mulch material, sands, soil, insecticides, fungicides, and herbicides; and sand, cinders, and salt on roads in the same uniform manner and which has not heretofore been possible. The selected materials may be spread over lawns, greens, shrubbery beds, hedges, and other similar places which with the former art could not be done and one had to rely on spraying which is impossible with some of these materials and still provide a uniform and adequate coverage.

This spreader may also be used to spread fertilizers and materials over the berm or grassed area at the side of the road while the vehicle is travelling at relative high speed.

Thus lateral broadcast can be accurately proportioned by the amount fed and the area covered can be accurately controlled by the speed of the rotary shaft. The broadcast is amost perfectly uniform and far superior to any uniformity heretofore obtained with conventional spreaders.

This spreader can broadcast uniformly in areas up to a maximum of sixty feet laterally from the point of contact of the dropping material with the flails. The uniformity is equally discernible over the area close to the spreader as well as to the maximum lateral distance. This is true because the flails intercept the stream of the falling material at different points on the radii of the flails, thus a wide range of lateral trajectory occurs.

The spreader does not need to travel over the ground being covered unless the radially extending rotary members are disposed transversely of the movement of the vehicle. It is preferable to have the rotary broadcaster longitudinally of the vehicle. This permits the spreader to broadcast over wide areas without the unit having to travel over the areas. Thus steep hillsides may be covered, ditches and valleys may be covered, wet areas may be covered, fence rows, shrubbery and tree areas may be covered, all by side broadcasting.

The hopper or bin of the spreader may be divided into a plurality of separate bins along the long hopper opening or throat which permits each bin to drop its contents along the radially extending rotary members. In this way each material is spread by its own section of the rotary cylindrical broadcaster over the same area and the blend of several materials is on the ground with each being a separate and uniform broadcast that overlies each other.

The same machine with modifications can be used as a planter for broadcasting grain or seeds. The radially extending members can be rubber or covered with rubber and will not harm the seed when dropped thereon and batted or flung over the field.

The important principle of this spreader or broadcaster of materials is that the material is freely dropped into the path of the freely rotating shaft and its extending members. These members may be flexible such as a rubber belt or a flexible metal member mounted radially in the rotary shaft. They may be made of plastic. These members may be flails or paddles hinged to the shaft on axes that are substantially parallel with the axis of the shaft. In certain instances these members may be chains. These flail-like members drop when the shaft stops rotating but they quickly extend substantially radially as the shaft rotates up to speed. The impact of the material on these members will, of course, transfer some kinetic energy to the movable or flexible member which is afterward retransferred to the material in broadcasting it out through space. The closer to the axis that the material strikes the paddle the less the distance the material travels. This provides a natural distribution of the material over the whole area that is uniform and consistent. There are no rows of concentrated lime; there are no lumps or heavy clods. These are all broken up by the hammer mill action of these members.

The members may be individually pinned or fastened to the shaft or one long pin may hinge a row. It is preferable that the adjacent members are staggered spirally and offset to one another so that while in motion there is no opportunity for any of the material to escape downwardly through path of the rotary broadcaster. The design of the spreader always permits the rotary broadcaster to start without load and finish without load, hence it is free swinging and out of contact with the material in the hopper.

In spreading manure some of the members may be employed as choppers which are flail members having a curved sharp edge to cut the long straw and also provide some broadcasting propulsion thereto. The whipping and flail action on the manure breaks up the material.

By having the rotary shaft with the radially extending members disposed longitudinally of the vehicle being pushed or pulled, the drive from the tractor power unit remains lineal requiring no gears to be inter-engaged to turn corners to drive the broadcaster. As the drive comes from the power tractor it remains lineal into the broadcasting shaft. This is a material savings in efficiency of operating the machine and materially reduces its cost.

The broadcaster is very simple, very rugged and not amenable to breakage. In actual practice the PTO tractor speed has been found perfectly satisfactory for the rotary broadcaster. No transmission is thus necessary. In such a combination no gears, belts, sprockets, chains are required providing a machine with one moving part, the ultimate in simplicity.

The laterally extending broadcast pivoted members drop with a jarring action when rotation is stopped and thus clean themselves eliminating the constant cleaning required of conventional spreaders. The flails break up lumps while spreading the fines. Then when the door is opened to permit large lumps to pass through the throat the lumps drop on the hammermill acting flails which break the lumps and broadcast the same uniformly. Thus lumps or fines, moist or dry material provide no clogging and are broadcast uniformly.

Another object is the provision of a spreader consisting of a rotary paddle means that can be supported entirely independent of the hopper supplying the same or may be supported or drawn by the vehicle carrying the material. Thus an ordinary dump truck may guide material onto an independent spreader hitched to the back of the truck regardless of whether the material in the truck is to be broadcast on the field or on the road.

Other objects and advantages of this invention appear hereinafter in the following description and claims.

The accompanying drawings show for the purpose of exemplification without limiting this invention or the claims thereto, certain practical embodiment illustrating the principles of this invention; wherein FIG. 1 is a perspective view of the fertilizer spreader comprising this invention.

Figure 1:
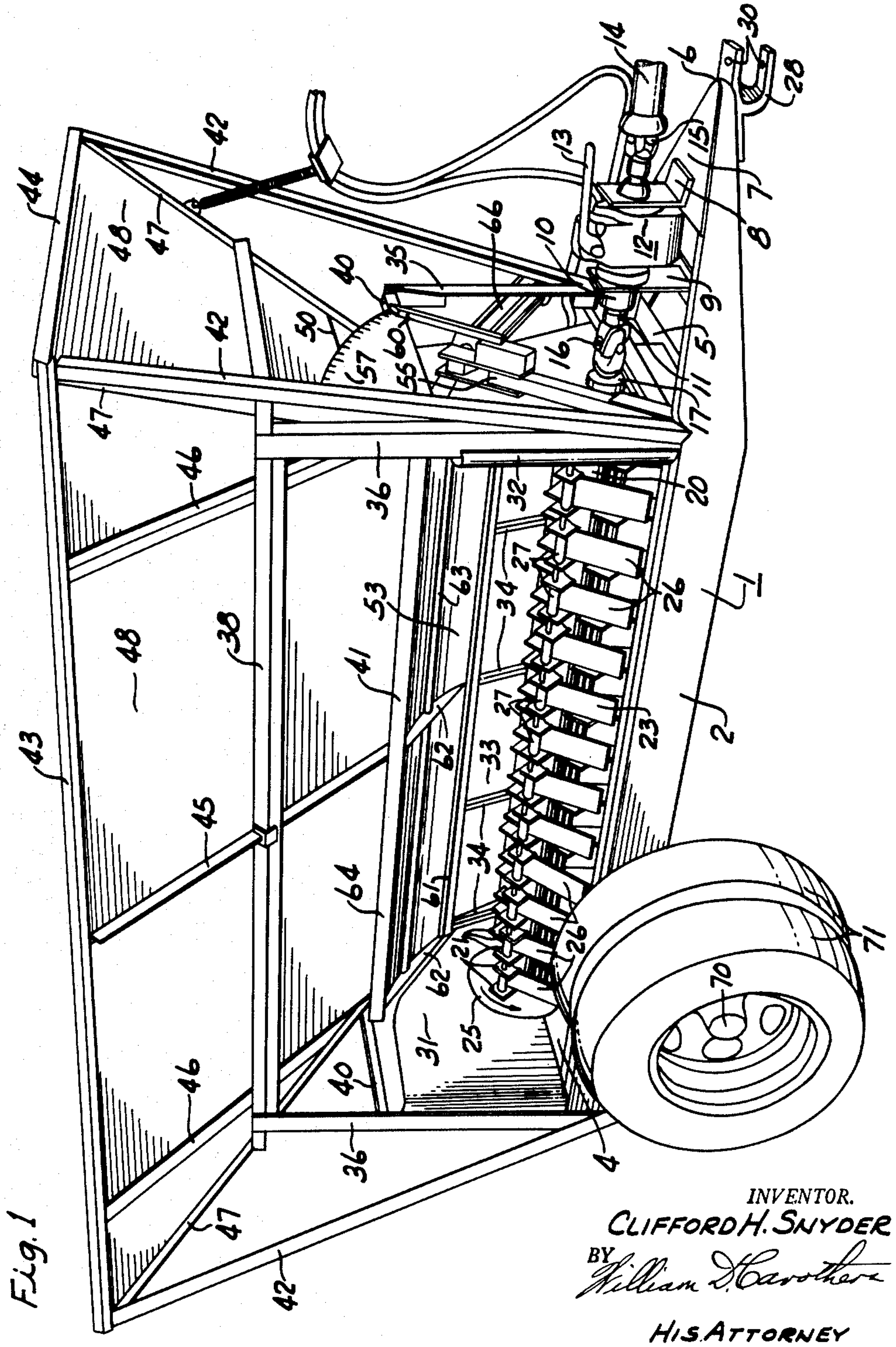

Referring to the drawings the fertilizer spreader comprising this invention includes a vehicular frame 1 including the longitudinal box members 2 and 3 connected at the rear by the box member 4 and at the front by the member 5. The forward end of the box members 2 and 3 are drawn together to the apex 6 which is closed over by a plate 7 to support the bracket members 8 and 9. These bracket members 8 and 9 support the collar 10 that carries a bearing for the output shaft 11 and also the transmission 12 rotated by the drive shaft 14 through the universal joint 15. The output shaft 11 is connected to the shaft 20 through the universal joint 16. The bearings 17 and 18 mounted on the cross members 5 and 4 respectively rotatably support the shaft 20. This transmission is provided with a gear shift 13 to change the rotary speed of the drive from the tractor through the drive connection 14 of the universal joint 15. Thence the drive continues through the collar 10 from the transmission 12 to the shaft 11 where a second universal joint 16 is interposed in the drive to the spreader shaft member supported by the bearings 17 and 18 and extending between the cross member 5 and the cross member 4 from the front to the rear of the chassis or frame. In many cases no transmission is utilized, the tractor PTO being connected by the drive shaft to the rotary broadcaster shaft. This shaft 20 is preferably a large tube and is provided with a series of uniformly spaced bracket members 21 welded to the face of the shaft 20 and projecting outwardly in planes transverse to the axis of the shaft. These brackets are provided with aligned holes to receive the pivot rods 22 that extend through each of the brackets 21 to pivotally secure the paddles 23 thereto. The pivot rods 22 abut against the circular end plates 24 and 25 and are thus held in position. When it is desired to remove or replace any of the paddle members 23 one of the circular abutment plates 24 or 25 is withdrawn and the respective rods 22 is removed through the openings in the brackets 21 to replace a paddle member 23.

Figure 5:
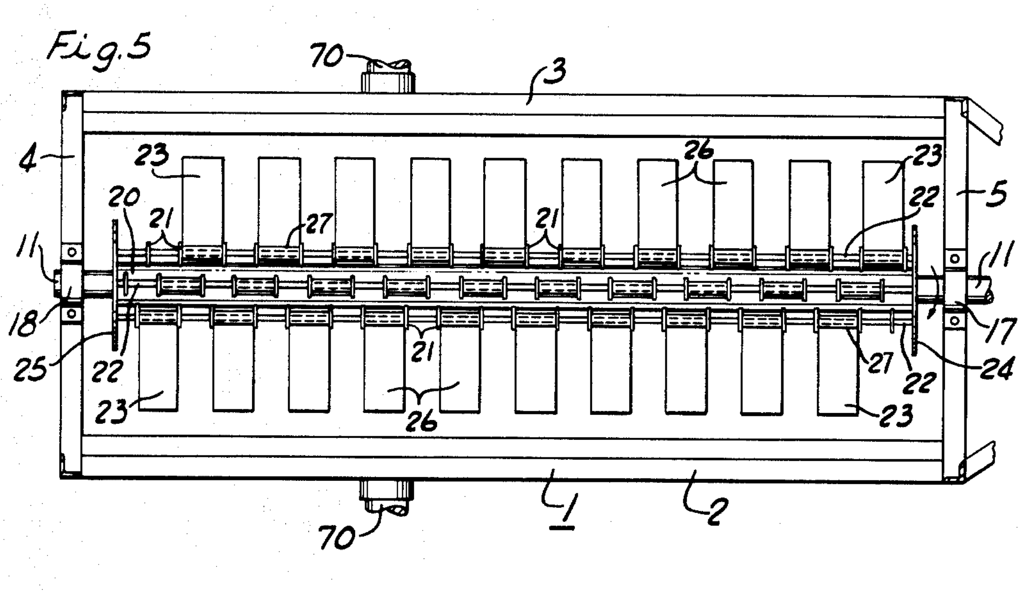
FIG. 5 is a view in horizontal section with parts broken away showing the broadcaster with its flail elements extended.
Figure 6:
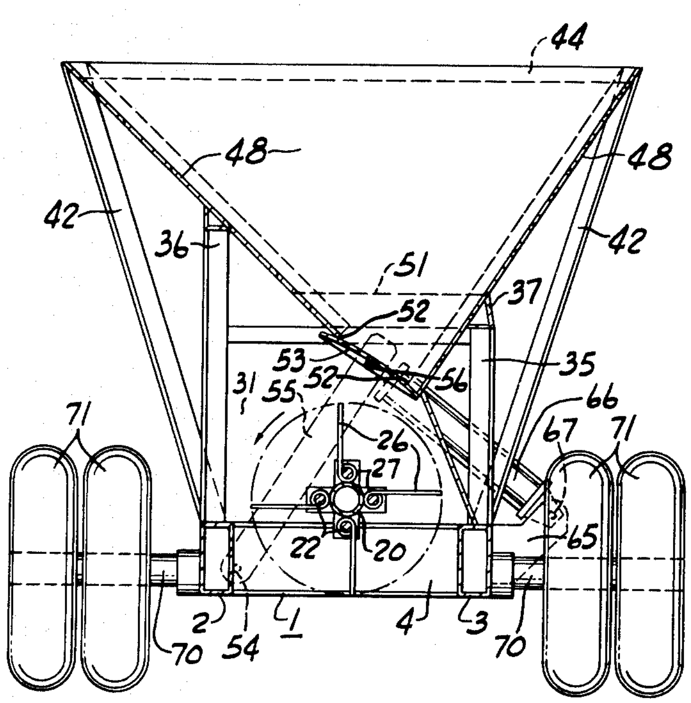
FIG. 6 is an enlarged sectional view taken on the line 6—6 of FIG. 3.

The paddle members 23 are flails in that they are made of steel plates 26 of approximately one-eighth to three-sixteenths inch thick and are welded to one side of the tube 27 which functions as a pivot bearing and the paddle blade 26 is offset from the tube 27 as shown in the middle row illustrated in FIG. 5. It would be noted from FIG. 6 that each of the rows of paddles held by the rods 22 is disposed at ninety degrees relative to each other and form the view shown in FIG. 5. The consecutive series of paddles are mounted in an offset position following a spiral path around the shaft 20 from one end to the other. Thus when rotated at a fair speed the centrifugal force of the paddles will cause them to project outwardly as illustrated in FIGS. 5 and 6; and it is obvious that at a selected speed any material dropping on these rotating paddles will strike the same and be hurled laterally in the direction of rotation, the material being spread through a trajectory that uniformly covers an area over twenty feet from the side of the machine depending on the said selected speed. Thus the fertilizer does not depend on a feed screw or orifices for dropping streams of fertilizer in the field but will broadcast the same over a large area as the vehicle is drawn forward. However since the drive of the broadcaster is taken directly from a power takeoff on the tractor the paddles may be brought up to broadcasting speed before the fertilizer is supplied thereto and the paddle members may continue to broadcast fertilizing material even though the frame is standing still unless of course the broadcaster is stopped.

The flail paddles 23 when struck by a falling chunk of fertilizing material will impart enough energy to break-up the chunk into small pieces and when it is distributed or broadcast the fertilizer is in a fine relatively uniform distribution. In view of the fact that the paddles or flails 23 are hinged, the centrifugal force imparted to their mass would allow them to transmit this energy to particles falling thereon and thus provide the necessary force for breaking large or small chunks prior to distribution of the same. It is obvious that the hinged flail or paddle members may be struck hard enough to momentarily retard its motion but it quickly speeds up and distributes the material before it approaches a horizontal position as shown in FIG. 6. Since these paddles are each pivotally attached to the shaft 11 and they vary in pivotal position owing to the fact that they strike objects of different weight, such as a balled or clustered mass of fertilizer, they shift relative to the shaft 11 on its perimeter which changes the effect of inertia of the rotary paddles making up the broadcasting system thus creating an unbalance of the shaft and the paddle system which is an aid because this effect vibrates the frame and the material being fed from the hopper.

Referring again to FIGS. 1 to 3 an ordinary U-shaped draw bar 28 is provided at the tongue end of the frame to receive a draw bar therebetween that has a hole to align with the holes 30 for receiving a draw pin that pulls the vehicle over the field.

The chassis is open above and below the rotary broadcaster. However, the ends are closed by the plates 31 and 32 and the left side is closed by the panel 33 provided with the brace members 34.

A superstructure in the form of the four vertical posts 35 and 36 is secured at the corner positions of the frame 1 defined by the ends of the transverse members 4 and 5. The corner posts 35 are short and form the back of the frame which is connected by the cross rail 37. The corner posts 36 on the broadcasting side are higher than the corner post 35 and are connected by the rail member 38. The top of the shorter posts 35 is connected to the longer posts 36 by the horizontal cross members 40. These cross members also support a horizontal rail 41 which corresponds to the horizontal rail 37 on the back of the frame.

Figure 3:
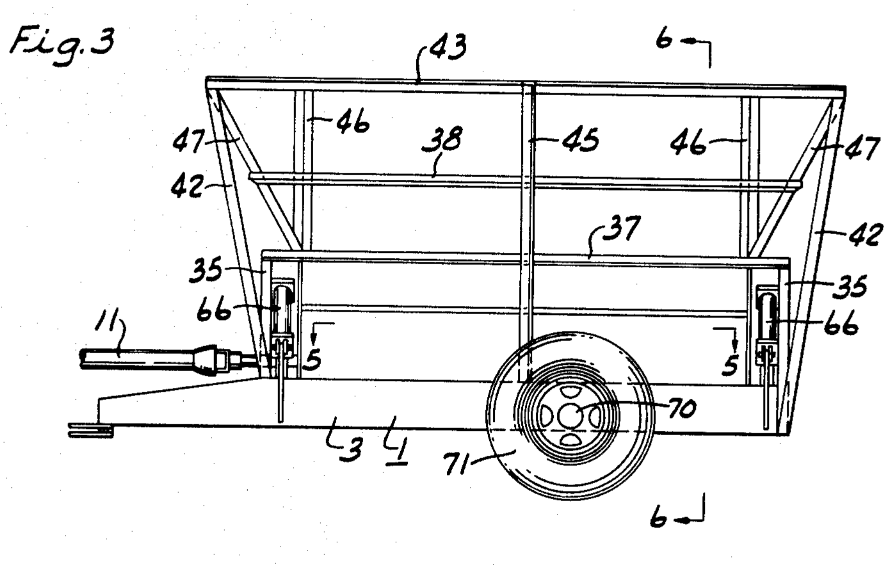
FIG. 3 is a view in side elevation of the fertilizer spreader comprising this invention.
Figure 4:
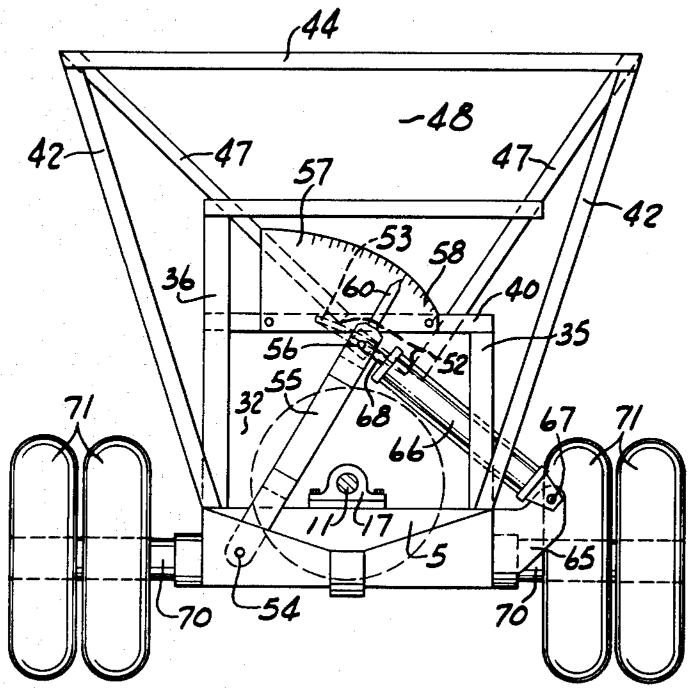
FIG 4 is an end view in elevation showing the front of the fertilizer spreader.

An outwardly and upwardly projecting corner post 42 extends upwardly from substantially the same position as the vertical corner posts 35 and 36 but they extend outwardly and are connected at the top by the side rails 43 and the end rails 44. On the back of the frame as shown in FIG. 3 there is also provided an upwardly and outwardly projecting center post 45 that meets with the side rail 43. This frame is completed by the sloping posts 46 of which there are three on each side that lie in vertical planes. These sloping posts are augmented by the corner sloping posts 47 that extend upwardly to the juncture between the top of the upwardly and outwardly extending posts 42 and the corners of the rectangular frame formed by the side rails 43 and the end rails 44. These sloping posts 46 and 47 define the shape of the hopper which is preferably constructed of wood panels 48 secured to the posts and rails and which slope downwardly to the end plate members 50 and 51 at opposite ends of the bin which are provided with an arcuate mouth 52 braced by the arcuately shaped gate valve member 53. The arcuate mouth 52 and the arcuate shape of the gate 53 is struck from the pivot points 54 on the cross members 4 and 5 at the front and back of the vehicle and which support the radius arms 55 which extend upwardly and are pivoted to the valve 53 as indicated at 56. An arcuate plate 57 having indicia 58 marked thereon indicates the degree of opening of the arcuate gate valve 53 and which is indicated by the pointer extension 60 from the radius arm 55 at the front of the vehicle. This enables the operator of the trailer to observe the degree of opening of the valve to determine the amount of fertilizer that is being spilled through the throat 61 from the hopper. The arcuate valve member 53 is preferably made of sheet metal and has the formed ribs 62 at the ends and in the middle thereof and is reinforced by a central rail member 63. The upper edge of the gate valve 53 is turned upwardly to form a closing lip as indicated at 64.

A bracket 65 is mounted on the chassis and pivotally supports the fluid actuated double acting jack piston and cylinder 66 from the pivotal point 67. The piston 68 is pivotally connected to the pivot member 56 on the radius arm 55. Thus when the fluid actuated cylinder is extended the arcuate gate is moved to the left in FIG.

Figure 2:
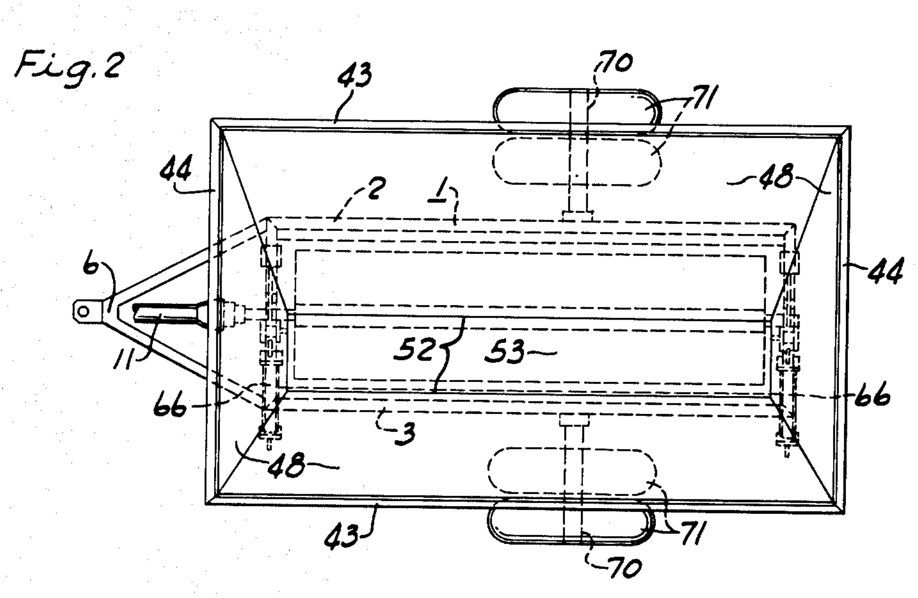
FIG. 2 is a top plan view of the fertilizer spreader comprising this invention.

4 and thereby increases the opening of the mouth 61 of the hopper in accordance with the degrees indicated at 58. If the piston 68 is retracted in the cylinder 66 the gate will close the mouth of the hopper. Thus the regulation of the spillage of fertilizer from the hopper is controlled by this arcuate gate valve and this of course may be adjusted in accordance with the speed of the travel of the vehicle, as the rotary speed of the broadcaster is ordinarily maintained at a constant rate when the arcuate gate valve 53 is large and long two jack piston and cylinder members 66 are required to operate the same, one at each end as shown in FIGS. 2 and 3. When two cylinders are employed it is preferable to provide a fluid equalizing valve therebetween which is indicated as 66' in FIG. 1.

Axle members 70 are welded to the sides of the frame members 2 and 3 at any suitable position for supporting the single or dual wheels indicated at 71. The relative position of said axial member 70 along the sides of the frame members 2 and 3 determine the load weight on the tractor through the draw bar 28.

Figure 7:
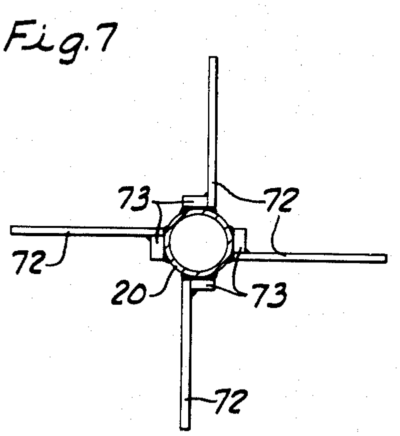
FIG. 7 is an enlarged transvers sectional view of a modified form of distributor employing spring paddles.

Referring to FIG. 7 it will be noted that the shaft member 20 has secured thereto a series of paddle members 72 each of which is welded to the face of a block 73 that is in turn welded to the shaft. The paddle members 72 are made of spring steel and will flex. Thus the flail action of the paddle member 72 is substantially the same as that of the pivoted flail member 23. The spring paddles 72 are disposed in a spiral path around the circumference of the shaft 20 in the same manner as that of the paddle members 23 in FIG. 5 and since they have substantially the same width and extent they too will function to broadcast everything that strikes them when dropped in the vicinity of the rotating paddles.

Figure 8:
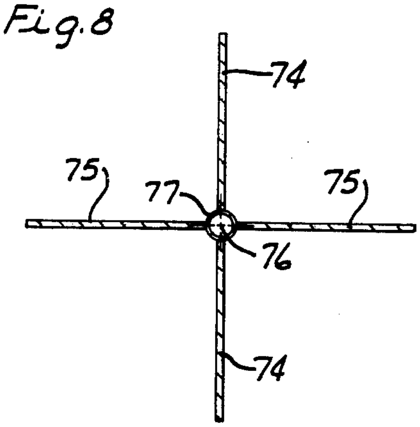
FIG. 8 is an enlarged transverse sectional view of a distributor employing fixed cross boards.
Figures 9, 10, 11, 12, 13:
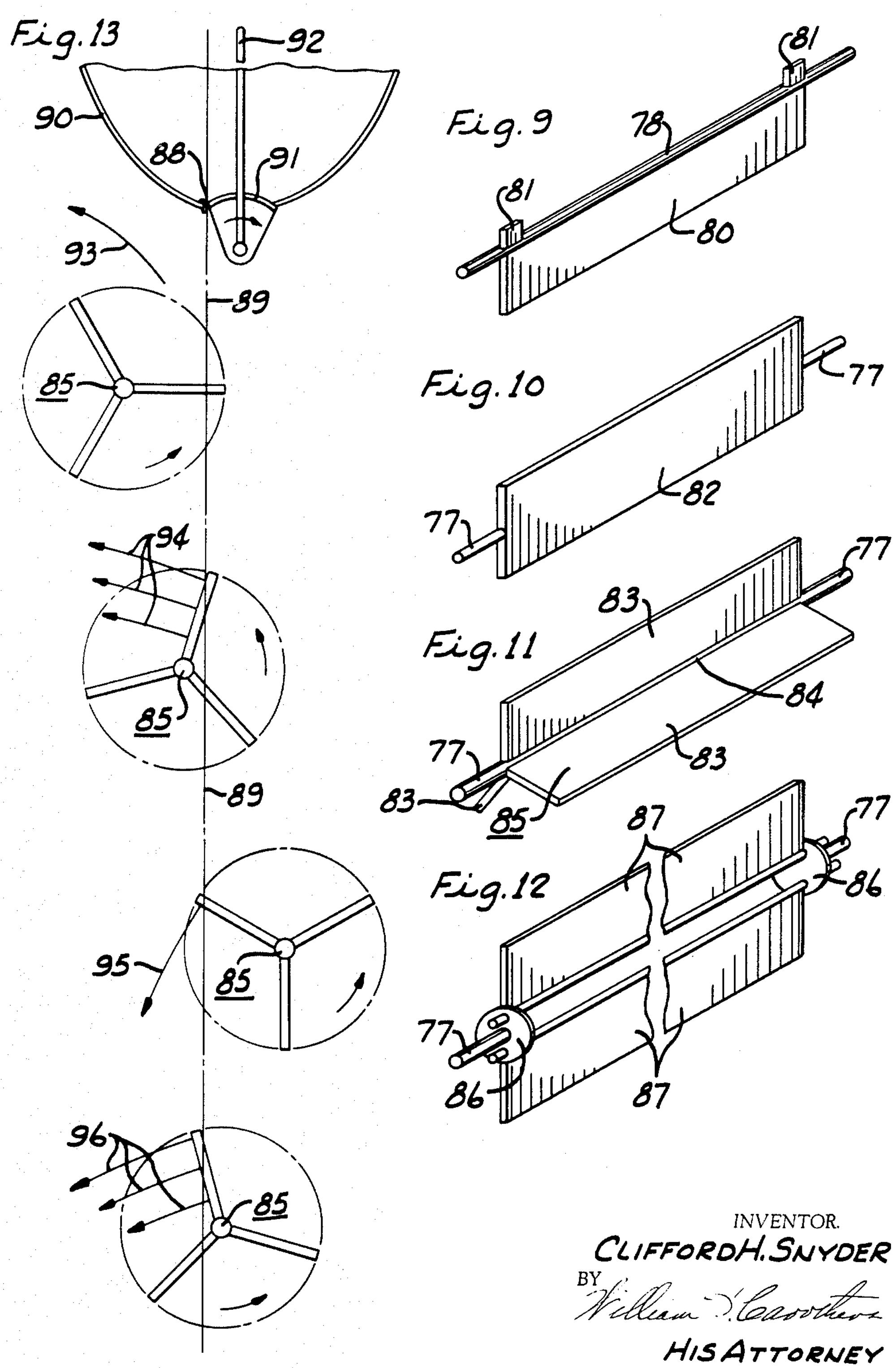
FIG. 9 is a perspective view of a modified form of distributor showing a single counterbalanced fixed half blade.
FIG 10 is a perspective view of a modified form of distributor showing a single counterbalanced fixed full blade.
FIG. 11 is a perspective view of a modified form of distributor employing two hinged blades.
FIG. 12 is a perspective view showing a modified form of distributor employing two hinged blades.
FIG. 13 is a diagrammatic view of the hopper discharge and the rotary broadcaster at different relative positions.

Referring now to FIG. 8 the broadcasting member is constructed of two crossboards adjoined at 74 and 75 joined at the rotary axis 76 and the opposite ends of which are provided with the stub shaft 77 for mounting in aligned journals and on which some form of rotary drive is provided. Here there is no shaft but the cross boards themselves form the rotary member and is the shaft for the full extent of the paddle and is rotatably supported by the stub shafts. This paddle board may be made of any suitable material such as wood, fiberglas, sheet metal and it may be partially flexible as when constructed of flexible plastic or elastomer such as a resin or rubber in which case it might be advisable to have the shaft extend through the axis as illustrated in FIG. 9. In FIG. 9 the shaft member 78 does extend the full length of the paddle with the stub shaft sections projecting at opposite ends. Here the paddle 80 is only on one side of the shaft and is counterbalanced by the weights 81.

In the structure of FIG. 10 the single paddle member 82 is provided with the stub shaft sections 77 and is merely a single board made of any of the aforementioned materials.

In the structure of FIG. 11 the paddle board has three plates 83 all of which are joined on the axial member 84 and is provided with the outwardly extending stub shaft section 77 as shown. This triangular paddle 85 has many advantages because its blades are 120° from each other and provide a generous area for the trajectory for the material being catapulted therefrom.

In the structure of FIG. 12 the stub shafts 77 are secured to the discs 86. These blades have pivoted thereto the long paddle board members 87 and thus function very similarly to the structure shown in FIGS. 1 to 6, but there is no center shaft member.

Referring now to the diagrammatic view of FIG. 13 the relative adjustable position of the rotary paddle member 85 with respect to the mouth 88 of the hopper 90 the opening of this mouth is controlled by the gate 91 operated by the lever 92.

When the paddle member 85 is positioned as illustrated in the uppermost figure and is to the left of the center of the discharge line 89, the material will engage the paddle adjacent its perimetral edge which is about the last position this paddle may be adjusted to the left without causing spillage of material. Upon the selection of the proper speed all the material will be caught and broadcast in the direction essentially following the trajectory shown by the arrow 93.

In the second position of the paddle 85 the rotary axis has been moved until it is closely approaching the discharge line 89 from the mouth 88. Here again, the material will follow somewhat the trajectory as illustrated by the arrows 94.

In the next position the paddle 85 has been moved to the opposite side of the discharge line 89 and it will engage the material as it is falling to force it somewhat outwardly but mostly downwardly as indicated by the arrow 95. In the lowermost figure the paddle 85 has been moved closer to the right side of the line 89 and should produce a minimum trajectory along the line of the arrows 96 for an eight to ten foot spread.

It is thought that the best adjusted positions of the paddle member 85 would be within or between the first adjusted position that is when the rotary axis is to the left of the line 89 or when the rotary axis is substantially on the line 89.

Figure 14:
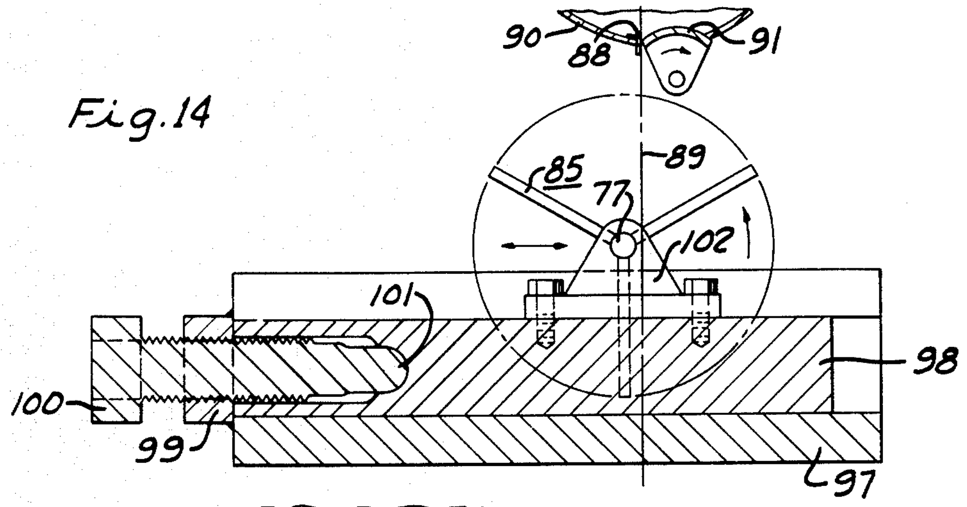
FIG. 14 is a transverse sectional view of the hopper discharge and the rotary broadcaster being adjustable by a screw.

There are many different ways of mounting the rotary paddle, however, the structure illustrated in FIG. 14 shows a fixed block member 97 which is hollow to provide for sliding block 98. One end of the block is provided with a threaded nut member 99 to receive the threaded bolt 100 which is swivelly connected to the block 98 as indicated at 101 and when the bolt 100 is turned the inner block 98 carrying the bearing 102 is movably adjustable along the stationary block member 97. Thus if two bearing members 102 are spaced in aligned relation for supporting the rotary axis of the paddle the latter may be adjusted to any desired position relative to the discharge line 89 as illustrated in FIG. 13.

Figure 15:
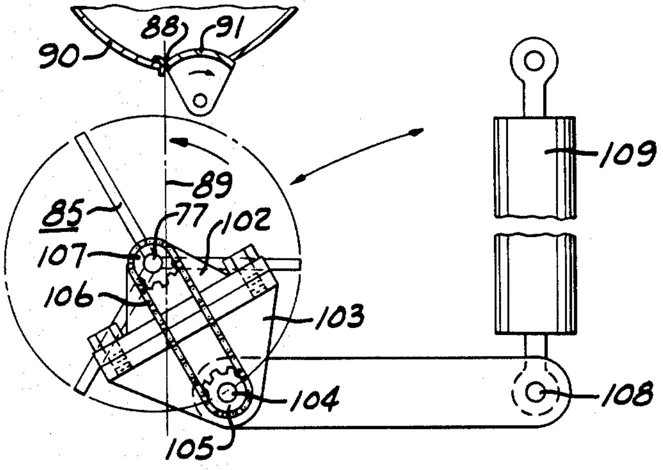
FIG. 15 is a transverse sectional view of the hopper discharge and the rotary broadcaster being adjustable by the bell crank mechanism.

In the structure shown in FIG. 15 the position of the paddle may be obtained in another manner. Here the paddle member is supported by a bearing 102 on one arm of the bell crank 103 which is pivoted on a fixed axis 104 that also carries a sprocket 105 to drive the chain 106 and through the sprocket 107 and drive the stub shaft 77 of the paddle member 85. Thus the shaft 104 is not only provided to drive the paddle member but also as the fulcrum on the pivotal point of the bell crank 103 the opposite arm of which is pivotally connected as indicated at 108 to the double acting fluid cylinder 109. In this manner the bell crank lever 103 may adjust the paddle 85 through an arc about the center of axis of rotation of the shaft 104 thereby adjusting the paddle relative to the discharge line 89.

Figure 16:
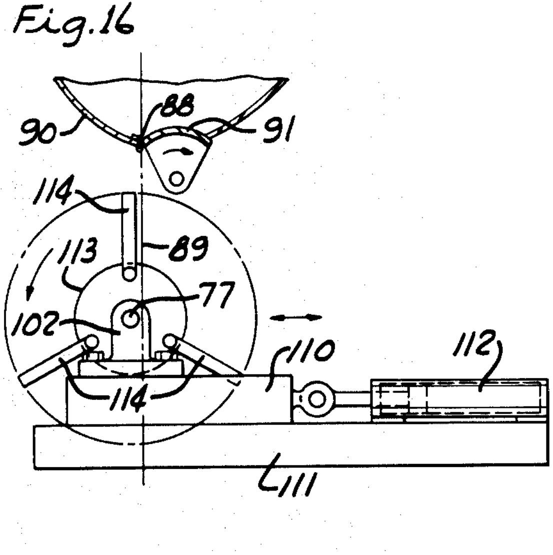
FIG. 16 is a transverse sectional view of the hopper discharge and the rotary broadcaster being adjustable by a fluid actuated slide.

In FIG. 16 the bearing members 102 are mounted on the blocks 110 which are adjustable along the ways 111 by the double acting fluid piston and cylinder 112 which is enabled to move the block at any desired position along the ways 111. Here the paddle member is indicated by a disc 113 carrying the pivoted paddles 114 each of which may be pivoted at a different position relative to the stub shaft 77 which is a structure very similar to that shown in FIG. 12.

Figure 17:
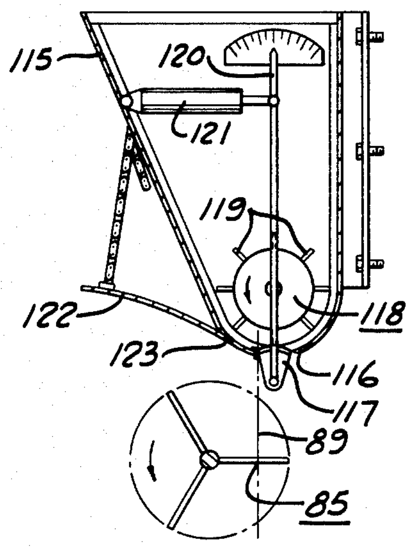
FIG. 17 is a transverse sectional view illustrating a deflector plate and a flute.
Figure 18:
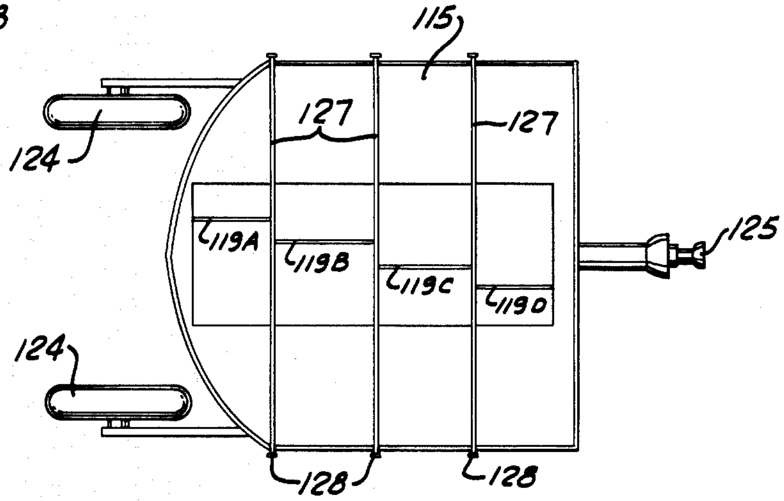
FIG. 18 is a plan view illustrating a flute in combination with movable partitions.
Figure 19:
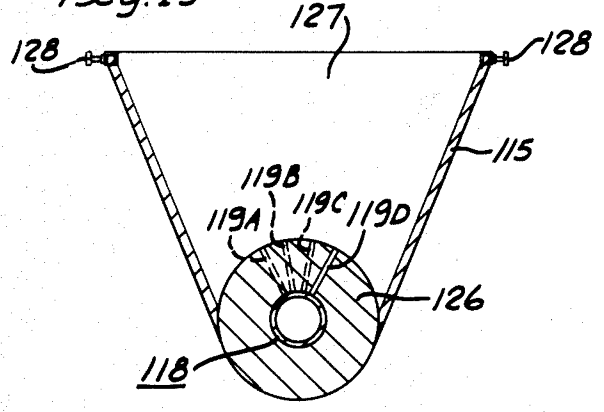
FIG. 19 is a transverse sectional view illustrating the partitions in FIG. 18.

Referring now to FIGS. 17, 18 and 19 which illustrates a small spreader for use on lawns, greens, and for shrubbery around the house may be hitched to a small tractor for pulling the same over the lawn or the green. As illustrated in FIG. 17 the hopper 115 is provided with a discharge throat 116 at the lower end thereof and which is controlled by the gate 117 and is likewise metered by the drum flute 118 carrying the blades 119 which is frequently referred to as a flute in the present drill type spreader art. This gate 117 is controlled by the lever 120 that is operable by the fluid actuated cylinder 121. A splash panel 122 is pivotally secured at 123 to the hopper 115 and is held in place by the chain as illustrated in this view.

Thus the flute member meters or otherwise feeds the material from the hopper to the mouth 116 from thence it is dropped along the discharge line 89 to the broadcast paddle 85.

The hopper and the paddle are supported as illustrated in FIG. 18 by the wheels 124 and the opposite end of the device is provided with a tongue member 125. It will be noted in FIG. 19 that the drum flute member 118 is provided radial separators 126 which divide the paddle members 119 into four sections as illustrated by the axially spaced separate radial paddles 119A, 119B, 119C and 119D. If it is desired to have more than one material spread at any one time the movable partitions 127 which have an arcuate opening to receive the disc separators 126 and have lock members 128 that extend over the rim of the hopper 115 and lock in place. The partitions may be aligned with the separators 126 so as to provide independent storage bins and as illustrated in FIG. 18 the storage section feeding 119A could be for grass seed, whereas the sections 119B to 119D would be for fertilizer or other similar material to be broadcast with the seed and this way more than one material is uniformly distributed at the same time. As illustrated each of the sections of the paddles 119 are arcuately distributed, one relative to the other, as illustrated in FIG. 19. Each paddle is positioned a little further around the drum flute member 118.

Figure 21:
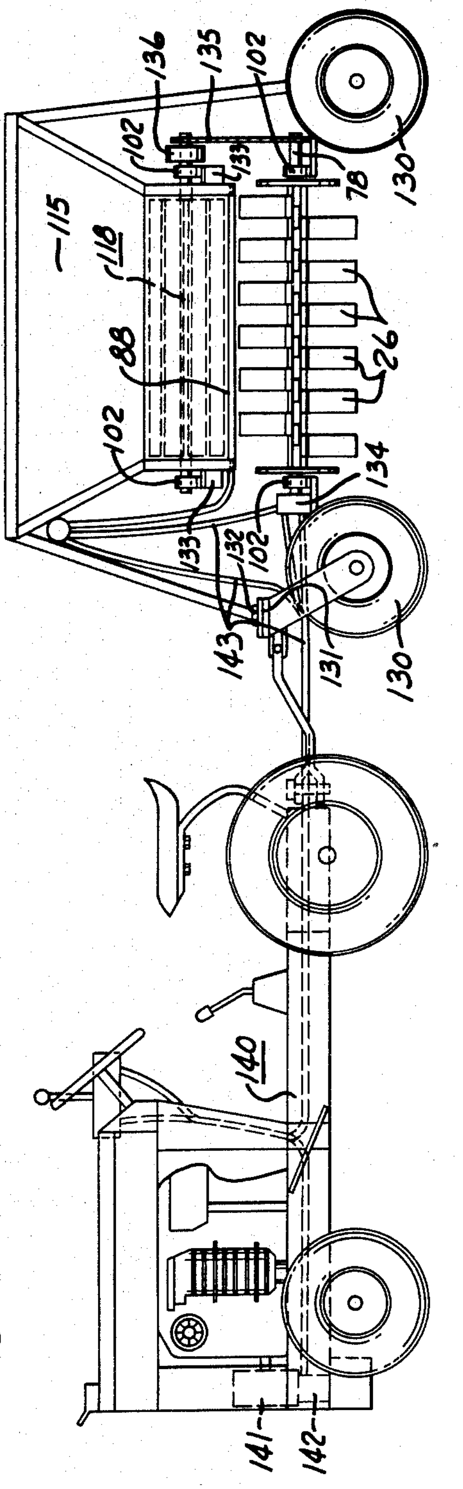
FIG. 21 is a view in side elevation showing a fertilizer being drawn by a tractor.
Figure 20:
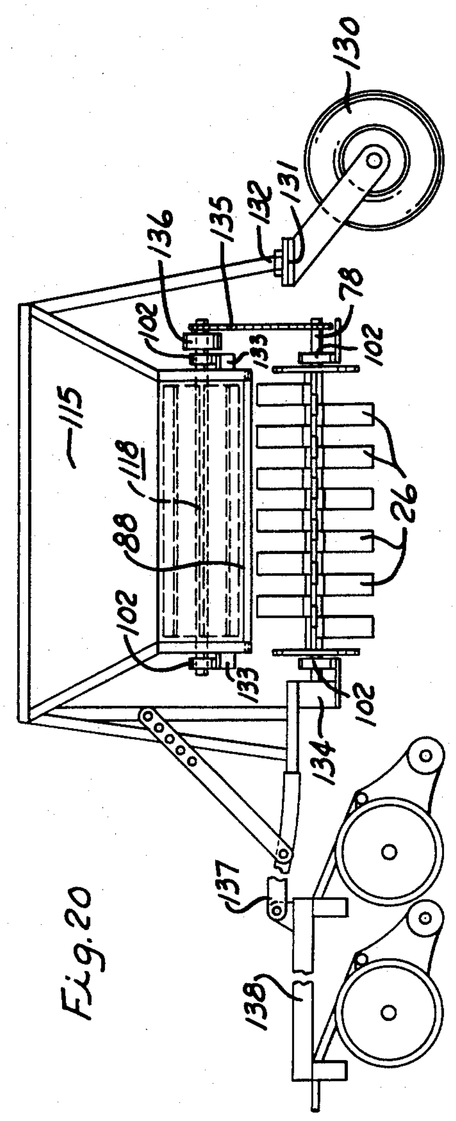
FIG. 20 is a view in side elevation showing a fertilizer attached to a mower.

The structure as illustrated in FIGS. 20 and 21 show the small size spreader attached to a lawn mower structure and also to a small tractor. As illustrated in FIG. 20 a small spreader is supported at the rear by the wheel member 130 which may be a caster type wheel with the caster bearing 131 on the frame 132. This frame extends upwardly and surrounds the upwardly open hopper 115 and its opposite ends are interconnected at the bottom only by the shaft 78 of the paddle member and the drum flute member 118. Each of the bearing supports 102 are mounted on standards 133 which connect directly to the ends of the frame.

A motor as shown at 134 will drive the shaft 78 and its paddle members which are pivoted thereon to rotate this member at the proper speed to broadcast the material fed from the throat 88 of the hopper 115. At the opposite ends of the shaft a chain drive 135 is connected to drive the speed reducer 136 for rotating the shaft of the drum flute 118. Thus the same motor 134 drives both shafts at proportional speeds for properly re-feeding the material to be broadcast. The motor 134 may be a gasoline type or an electric type or even a hydraulic type particularly where the gate 117 of the hopper is controlled by the same means such as the fluid motor illustrated in FIG. 17.

The front of the small spreader is shown to be provided with the tongue 137 which is attached to the lawn mower structure 138. Thus while mowing fairways or greens one can readily fertilize the same.

The structure shown in FIG. 21 is substantially the same as that illustrated in FIG. 20. However, here the small tractor 140 carries a hydraulic pump 141 over the reservoir 142 and the whole of the structure of the spreader is completely operated with a hydraulic control line as illustrated at 143. This structure rather than being suspended from the small tractor 140 is provided with two wheels 130 in the front.

Figure 22:
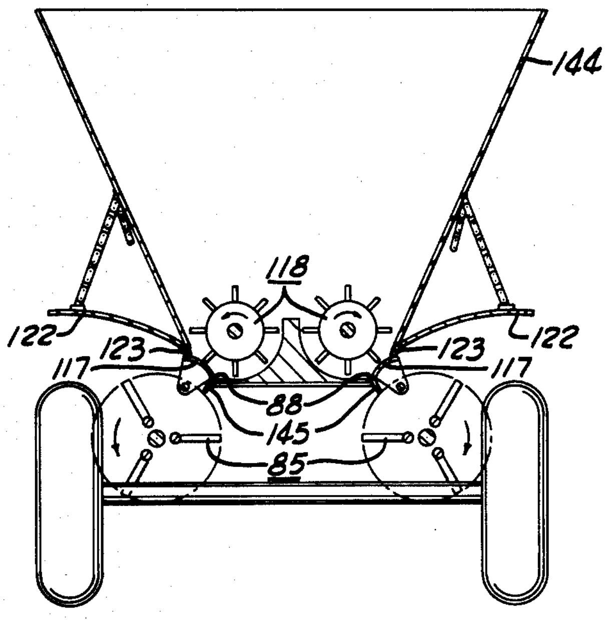
FIG. 22 is a view in transverse section illustrating a dual broadcaster for simultaneously fertilizing in opposite directions.

In the structure as illustrated in FIG. 22 the hopper 144 is provided with two drum flutes 118 and two paddle members 85 which are rotated in opposite directions and which function in the same manner to broadcast the material in opposite directions as the tractor draws the spreader. In this view a curved sealed door 145 is shown to form part of the mouth 88. The use of a duel paddle structure for spreading the fertilizer in opposite directions at the same time is also advantageous in the structures as shown in FIGS. 1 to 6, particularly where the large fertilizer is being drawn by a tractor through a grove such as a fruit grove wherein it is desired to broadcast fertilizer to cover two rows at one pass and thus requiring the drawing of the vehicle only through alternate rows of fruit trees.

Figure 23:
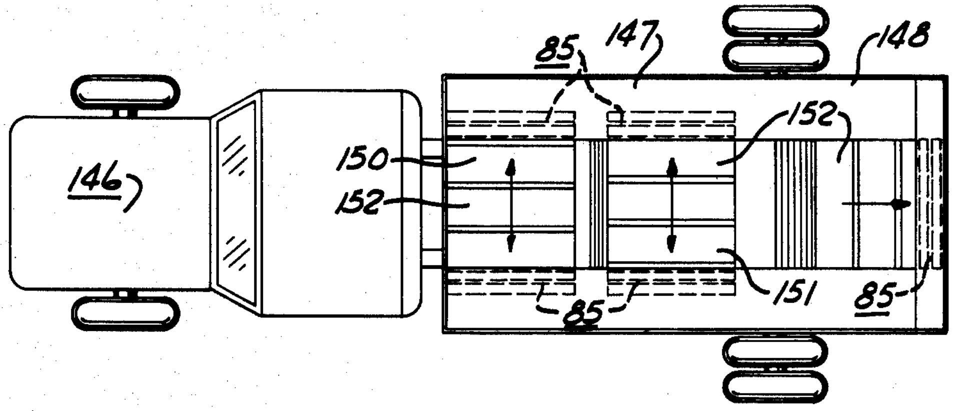
FIG. 23 is a plan view of a selectively lateral highway cindering truck.

Referring now to FIGS. 23 to 26 the spreader comprising this invention is illustrated for use in distributing sand, cinders, or salt or any other mixture on roads and the like. Here the structure is mounted on a truck 146 the bed of which carries one or more hoppers 147 and 148 as shown in the plan view of FIG. 23 and the sectional view of FIG. 24. The hopper may feed one or two lateral feeders 150 and 151, as illustrated in FIG. 23 one lateral feeder may be working in one direction at the same time that the other lateral feeder is working in the opposite direction and the drum flutes and paddles 118 and 85 will be selectively operated to perform this function. The rear hopper section 148 supplies its flute and paddle structure to distribute the material rearwardly. In addition to the flutes these structures are provided with conveyor sections 152 which are necessary to draw the material and discharge it on to the rotary paddles in which in the structure of FIG. 24 the rear paddle member 85 and its drum flute member 118 are turned lengthwise of the truck member 146 rather than transversely as shown in FIG. 23.

Figure 25:
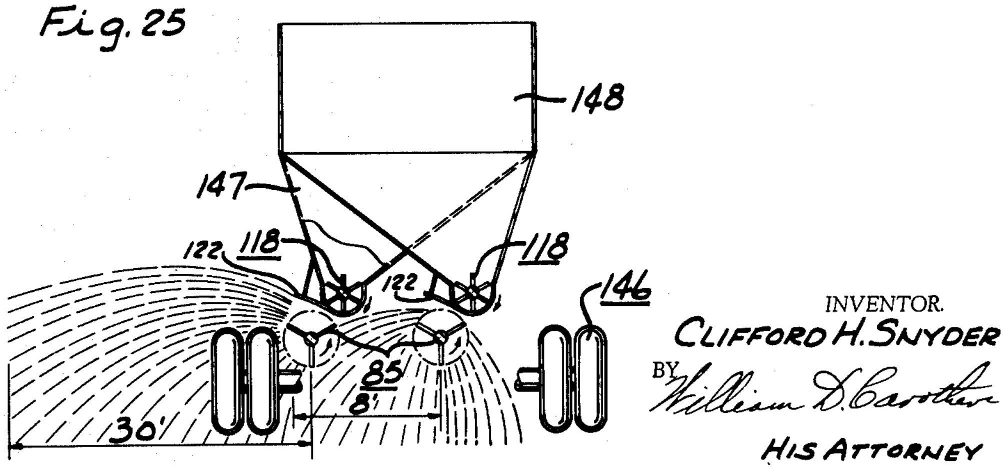
FIG. 25 is a transverse view in vertical section of the view shown in FIGS. 23 and 24.

In the arrangement shown in FIG. 25 the paddle members 85 are mounted to direct the material for the roadway or for broadcasting over a field in the same direction, yet these paddles are offset from each other to get a different character distribution of the material over the area. Here again the flutes 118 are rotated in the same direction which as illustrated in this view is clockwise and the paddles 85 are rotated counterclockwise.

Figure 26:
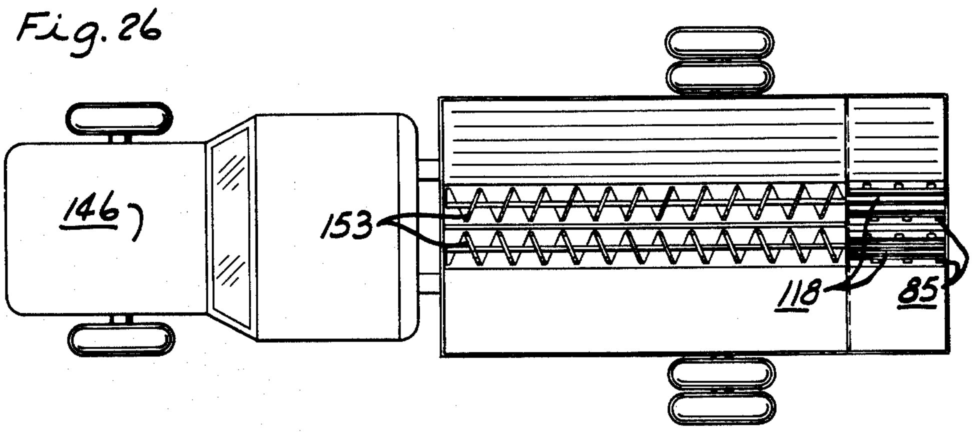
FIG. 26 is a plan view of a selectively lateral highway truck employing a screw feeder.
Figure 24:
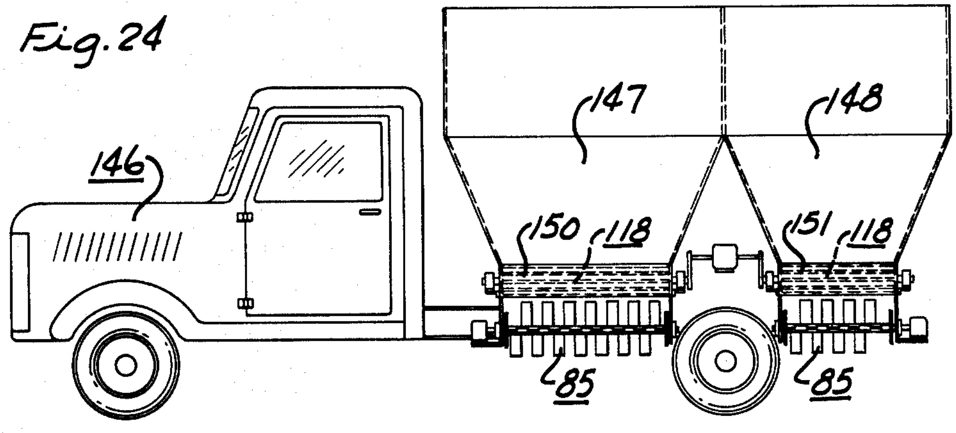
FIG. 24 is a view in vertical elevation of a lateral discharge highway cindering truck.

In FIG. 26 the truck 146 is provided with one long bed and has two screw conveyors 153 longitudinal of the truck bed to carry the material back to the drum flutes 118 from whence they are dropped to their corresponding paddle members 85 which broadcasts the material in both directions. In other words, rather than employ a flight type conveyor as illustrated in FIG. 23 one may employ a screw type conveyor as illustrated at 153 in FIG. 26 to feed the material to the flute and thence to the rotary paddles.

Figures 27, 28:
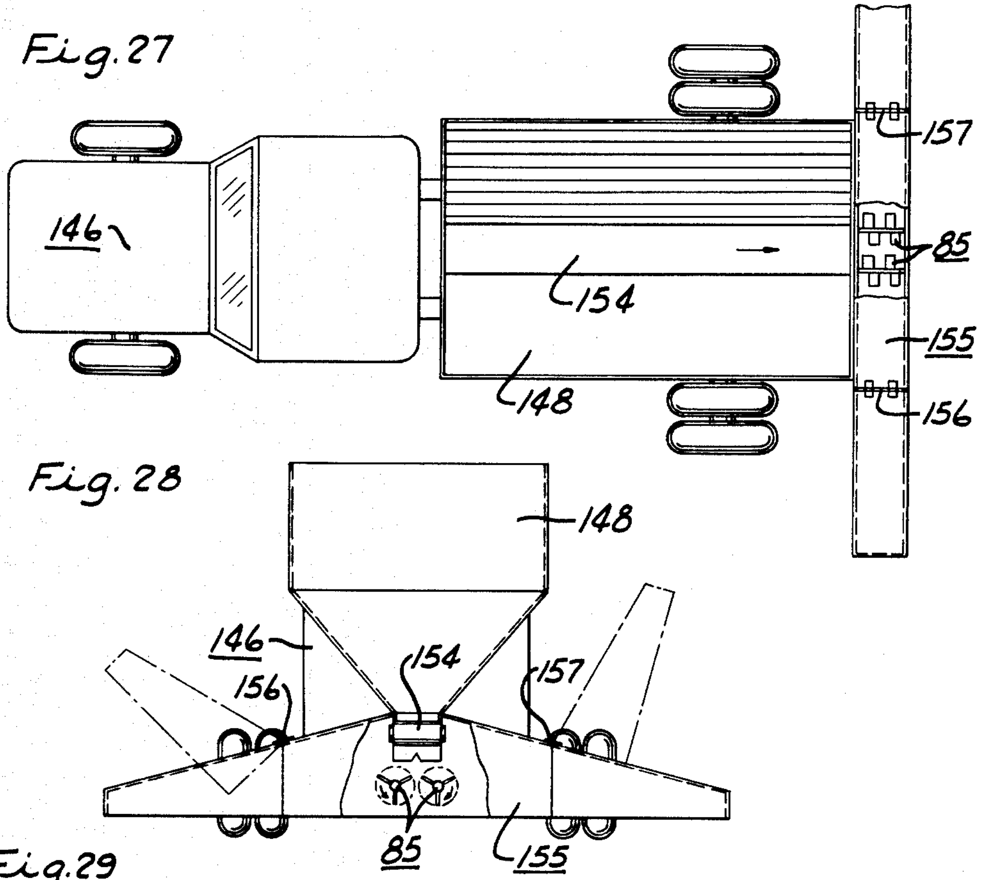
FIG. 27 is a plan view of a highway truck spreader having a belt conveyor discharging to lateral broadcasters.
FIG. 28 is a rear elevation of the structure shown in FIG. 27 with parts broken away.

Referring to FIG. 27 the truck 146 is provided with a hopper 148 which empties onto the belt conveyor 154 that extends for the full length of the hopper. The opening at the end of the hopper where the conveyor protrudes is designed to allow a predetermined amount of material to be fed out of the hopper. The conveyor 154 is adjustable vertically to enable one to change the amount of material discharged. The conveyor discharges the material on the rotating paddle broadcasting members 85 which propel the same laterally under the hood 155. The hood is hinged at 156 and 157 so that the ends may be drawn upwardly as shown in FIG. 28 to permit the truck 146 to travel with ordinary vehicles along the highway. This spreader is intended principally for broadcasting cinders, salt, gravel or other non-skid preparations on the highway or runways of an airport. The hood 155 restricts the broadcast to a definite width of the roadway. The broadcasting paddles 85 and the conveyor 154 may also be operated at different speeds to vary the application of the broadcast material.

Figures 29, 30, 31:
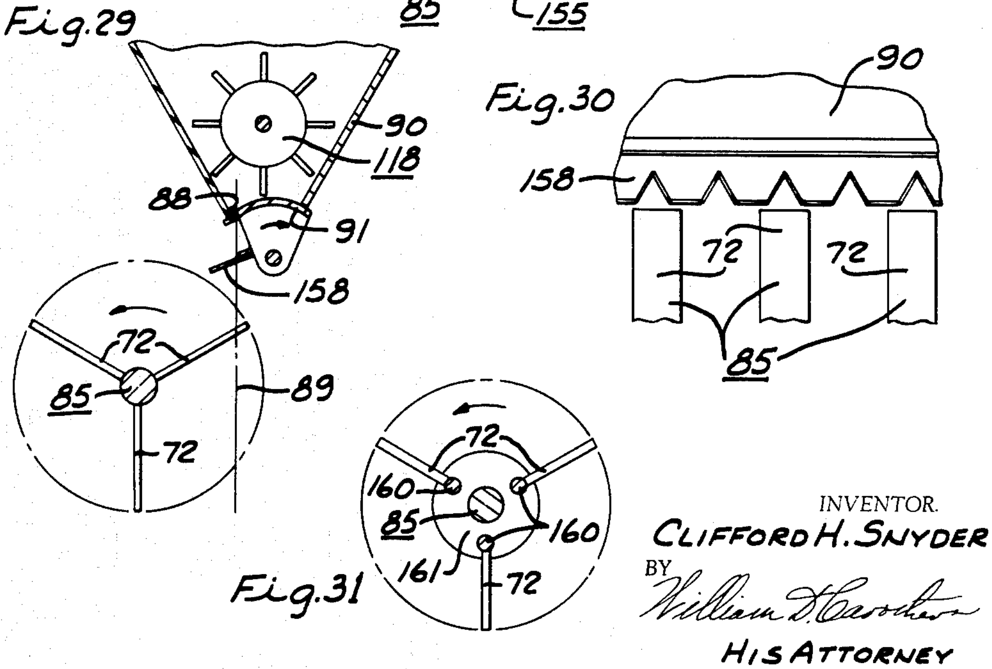
FIG. 29 is a sectional transverse view of a saw tooth distributing plate between the hopper and the broadcaster.
FIG. 30 is an enlarged view of the distributing plate and the flails of the broadcaster.
FIG. 31 is a transverse sectional view of a rotary broadcaster showing flails supported by separate shafts other than the driving shaft.

Referring to FIGS. 29 and 30 the rotary flute 118 is operating within the hopper 90 above the arcuate gate 91 that varies the opening or mouth 88 on the discharge line 89 over the broadcasting paddle 85 that has an annular series of paddles 72 that form a spiral path that covers the whole of the length of the discharge line 89 to broadcast all of the material coming from the mouth 88. 58 is an additional distributing member or plate. This distribution plate has a large saw tooth edge that allows some of the material to initially fall between the teeth and delays the balance causing it to roll from the ends of the blade teeth which in this instance are truncated. The degree of truncation or flatness of the teeth will determine the degree of distribution. Since the blades or paddle members 72 cover the whole of the area under the mouth 88 all of the material will be struck by the paddle and broadcast. However, the saw toothed distributor plate 158 aids in making a more even distribution. Although the trucks and vehicular hoppers are described for use in broadcasting different materials both types of machines may be used for every type broadcasting any character of material.

FIG. 31 demonstrates further that the plate or paddle members 72 of the broadcasting paddle 85 need not be supported by the main drive shaft. The paddle members 72 may be connected to separate support shafts 160 which in turn are carried by the disc 161. This enables the plate or paddle members 72 to pivot at different positions relative to the support shafts 160.

I claim:

1. A spreader consisting of a mobile hopper having a long narrow discharge, a paddle means at least as long as said hopper discharge and mounted below said discharge and independently open for free rotation in the open about a horizontal axis and supported to be trailed along with said mobile hopper and positioned below said hopper discharge, said rotary paddle means rotating below said hopper discharge to allow the material to be dropped freely through the air therefrom and into the path of said rotating paddle means to broadcast the freely dropped material laterally from the rotary axis thereof, and a convex arcuate gate with its convex surface supporting the material in said discharge and having its trailing edge movable across said discharge to determine the degree of opening thereof and allow the material to be spread to fall freely through the air on said paddle means, pivot means at the radius of said convex arcuate gate to support the same, a flute member rotatably supported in said hopper to feed said material to said discharge, lateral partition means on said flute member to divide the same longitudinally of its axis, movable partition means in said hopper having arcuate surface to mate with said lateral partition means on said flute member for providing independent sections in said hopper for receiving different materials to be broadcast at the same time by said paddle means.

2. A spreader hopper consisting of a storage chamber formed by converging walls ending in a semi-cylindrical section, a longitudinal discharge in the bottom of said semi-cylindrical section, a flute means journaled in said hopper to rotate in said semi-cylindrical section, veins on said flute means having rotary clearance with said semi-cylindrical section, transverse separators on said flute means extending radially the same distance as said veins on said flute means, adjustable partitions along said hopper and mating with said transverse separators to divide said hopper into independent sections for feeding different materials by said flute means and through said discharge at the same time to selectively broadcast proportionately and separately the different materials from the divided hopper over the same ground area without pre-mixing the materials in accordance with the adjustment of said adjustable partitions.

References Cited by the Examiner

UNITED STATES PATENTS

| | | | |
|---|---|---|---|
| 325,249 | 9/1885 | Johnson | 275—14 |
| 1,215,615 | 2/1917 | Brown | 275—3 |
| 1,278,366 | 9/1918 | Meyers | 275—2 |
| 1,639,203 | 8/1927 | Varnado | 275—3 |
| 2,430,020 | 11/1947 | Johnson | 275—8 |
| 2,498,833 | 2/1950 | Weyer | 275—3 |
| 2,506,054 | 5/1950 | Agee | 275—8 X |
| 2,669,271 | 2/1954 | Treckmann | 275—29 |
| 2,743,111 | 4/1956 | Ruth | 275—2 |
| 2,946,597 | 7/1960 | Simonsen | 275—8 |
| 2,947,544 | 8/1960 | Hurt | 275—8 |
| 2,952,466 | 9/1960 | Carlson | 275—6 |
| 2,967,056 | 1/1961 | D'Amato | 275—7 X |
| 2,982,555 | 5/1961 | Van Der Lely et al. | 275—15 X |
| 3,011,793 | 12/1961 | McElhinney et al. | 275—3 |
| 3,013,803 | 12/1961 | Prester | 275—8 |
| 3,025,067 | 3/1962 | Raney et al. | 275—6 |
| 3,041,750 | 7/1962 | Garnand | 172—45 X |
| 3,085,807 | 4/1963 | Tyler | 275—8 |

FOREIGN PATENTS

| | | |
|---|---|---|
| 618,403 | 3/1927 | France. |
| 299,827 | 8/1917 | Germany. |
| 654,178 | 12/1937 | Germany. |
| 5,484 | 1912 | Great Britain. |
| 30,496 | 12/1909 | Great Britain. |
| 584,809 | 1/1947 | Great Britain. |
| 627,379 | 8/1949 | Great Britain. |

ABRAHAM G. STONE, *Primary Examiner.*

WILLIAM A. SMITH, III, *Examiner.*